US010760838B2

(12) United States Patent
Goel et al.

(10) Patent No.: US 10,760,838 B2
(45) Date of Patent: Sep. 1, 2020

(54) METHOD AND APPARATUS FOR REFRIGERANT DETECTOR CALIBRATION CONFIRMATION

(71) Applicant: Lennox Industries Inc., Richardson, TX (US)

(72) Inventors: Rakesh Goel, Irving, TX (US); Robert B. Uselton, Plano, TX (US); Eric Berg, The Colony, TX (US); Mark Olsen, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 198 days.

(21) Appl. No.: 15/848,637

(22) Filed: Dec. 20, 2017

(65) Prior Publication Data

US 2019/0186798 A1 Jun. 20, 2019

(51) Int. Cl.

| | |
|---|---|
| ***F25B 49/00*** | (2006.01) |
| ***F25B 41/04*** | (2006.01) |
| ***F25B 45/00*** | (2006.01) |
| ***F25B 13/00*** | (2006.01) |
| ***G01M 3/16*** | (2006.01) |

(Continued)

(52) U.S. Cl.

CPC ............ *F25B 49/005* (2013.01); *F25B 13/00* (2013.01); *F25B 41/043* (2013.01); *F25B 45/00* (2013.01); *G01M 3/007* (2013.01); *G01M 3/16* (2013.01); *F25B 41/003* (2013.01); *F25B 2500/222* (2013.01)

(58) Field of Classification Search

CPC .... F25B 41/043; F25B 9/08; F25B 2345/002; F25B 2700/04; F25B 49/005; F25B 2500/23

See application file for complete search history.

(56) References Cited

U.S. PATENT DOCUMENTS

| | | | | |
|---|---|---|---|---|
| 4,726,195 A * | 2/1988 | Klee | F25D 3/10 | 62/388 |
| 5,024,061 A * | 6/1991 | Pfeil, Jr. | F25B 45/00 | 62/292 |

(Continued)

FOREIGN PATENT DOCUMENTS

| | | |
|---|---|---|
| EP | 0142424 A2 | 5/1985 |
| JP | 2007132586 A * | 5/2007 |

(Continued)

*Primary Examiner* — Nelson J Nieves

(74) *Attorney, Agent, or Firm* — Shackelford, Bowen, McKinley & Norton, LLP

(57) ABSTRACT

A refrigerant detector testing system according to aspects of the disclosure includes a metering orifice formed in a suction line that is disposed between an evaporator coil and a compressor, a valve fluidly coupled to the metering orifice, a connecting tube fluidly coupled to the valve on a side opposite the metering orifice, a mixing device having an input orifice fluidly coupled to the connecting tube. In some embodiments, the mixing device includes an air intake disposed proximate the input orifice, a throttling portion downstream of the input orifice and the air intake, the throttling portion having a reduced cross-sectional area, and a diffuser section positioned downstream of the throttling portion, the diffuser section having an output orifice. According to aspects of the disclosure, a refrigerant detector fluidly exposed to the output orifice.

6 Claims, 4 Drawing Sheets

(51) Int. Cl.
*G01M 3/00* (2006.01)
*F25B 41/00* (2006.01)

(56) References Cited

U.S. PATENT DOCUMENTS 5,122,341 A * 6/1992 Klodowski .......... G01N 31/224 422/430
5,176,187 A * 1/1993 Grant ................. B60H 1/00585 141/10
6,851,269 B2 * 2/2005 Nomura .................. F25B 45/00 62/149
7,866,172 B2 * 1/2011 Douglas ................ F25B 41/003 62/127
9,303,907 B2 * 4/2016 Kawano .................. F25B 45/00
2004/0055317 A1 * 3/2004 Nomura .................. F25B 45/00 62/149
2006/0010889 A1 * 1/2006 Meeker .............. B60H 1/00585 62/149
2006/0137366 A1 * 6/2006 Kang ...................... F25B 45/00 62/149
2008/0060367 A1 * 3/2008 Zima .................. B60H 1/00428 62/149
2009/0107157 A1 4/2009 Dube
2012/0090383 A1 4/2012 Lopez et al.
2012/0247146 A1 * 10/2012 Yamada .................... F25B 1/10 62/498
2013/0255294 A1 * 10/2013 Crawford ................ F25B 45/00 62/126
2015/0253045 A1 * 9/2015 Yamada .................... F25B 5/04 62/324.1
2015/0330705 A1 * 11/2015 Lee ........................ F25J 1/0022 62/611
2016/0025393 A1 * 1/2016 Rockwell ................ F25B 45/00 62/195
2016/0169566 A1 * 6/2016 Nakashima ............. F25B 40/02 62/500
2018/0023847 A1 * 1/2018 Nagano ................... F04B 39/04 62/500
2018/0274821 A1 * 9/2018 Lee ........................... F25B 1/06
2019/0056159 A1 * 2/2019 Togano ................. F25B 49/027
2019/0170383 A1 * 6/2019 Weinert ................ F24F 1/0041
2019/0217684 A1 * 7/2019 Oshitani .................. B60H 1/22
2019/0264927 A1 * 8/2019 Suzuki .................... F24D 17/02

FOREIGN PATENT DOCUMENTS

JP 2010210111 A * 9/2010
WO WO-2011/147958 A1 12/2011

* cited by examiner

METHOD AND APPARATUS FOR REFRIGERANT DETECTOR CALIBRATION CONFIRMATION

TECHNICAL FIELD

The present disclosure relates generally to heating, ventilation, and air conditioning (HVAC) equipment and applications and more particularly, but not by way of limitation, to methods and systems for testing and verifying calibration of a detector for refrigerant leaks using refrigerant contained in the HVAC system.

BACKGROUND

This section provides background information to facilitate a better understanding of the various aspects of the disclosure. It should be understood that the statements in this section of this document are to be read in this light, and not as admissions of prior art.

Commercial and residential HVAC systems require use of a fluid refrigerant. Federal, state, and local safety and environmental regulations play a role in dictating the type of refrigerant that may be utilized in a particular application. Due to environmental pollution concerns, future HVAC products will likely utilize refrigerants that are flammable. Applicable safety standards thus require the use of devices to detect refrigerant leaks in HVAC equipment. Such refrigeration-detection equipment may require periodic testing and calibration over the lifetime of the HVAC equipment. Using current technology, such testing and calibration would be performed by a technician during a service call, or the sensor or the entire refrigerant-detection device must the replaced during the service call.

SUMMARY

A refrigerant detector testing and calibration confirmation system according to aspects of the disclosure includes a metering orifice formed in a suction line that is disposed between an evaporator coil and a compressor, a valve fluidly coupled to the metering orifice, a connecting tube fluidly coupled to the valve on a side opposite the metering orifice, a mixing device having an input orifice fluidly coupled to the connecting tube. In some embodiments, the mixing device includes an air intake disposed proximate the input orifice, a throttling portion downstream of the input orifice and the air intake, the throttling portion having a reduced cross-sectional area, and a diffuser section positioned downstream of the throttling portion, the diffuser section having an output orifice. According to aspects of the disclosure, a refrigerant detector fluidly exposed to the output orifice.

An HVAC system according to aspects of the disclosure includes an evaporator coil, a circulation fan disposed to direct air through the evaporator coil, a compressor fluidly coupled to the evaporator coil via a suction line, an HVAC controller, a metering orifice formed in the suction line, a valve fluidly coupled to the metering orifice and electrically connected to the HVAC controller, a mixing device fluidly coupled to the valve, the mixing device having an air intake and an output orifice, and a refrigerant detector fluidly exposed to the output orifice.

A method of testing a refrigerant detector according to aspects of the disclosure includes measuring, via an HVAC controller, a calibration interval, opening a valve that is fluidly coupled to a suction line for a first pre-determined period of time, transmitting an amount of refrigerant through the valve and to a mixing device, diluting the refrigerant with air in the mixing device to create a refrigerant/air mixture, discharging the refrigerant/air mixture from the mixing device towards a refrigerant detector, and detecting, via the HVAC controller, if the refrigerant detector alarms responsive to exposure to the refrigerant/air mixture.

This summary is provided to introduce a selection of concepts that are further described below in the detailed description. This summary is not intended to identify key or essential features of the claimed subject matter, nor is it to be used as an aid in limiting the scope of the claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Figure 1:
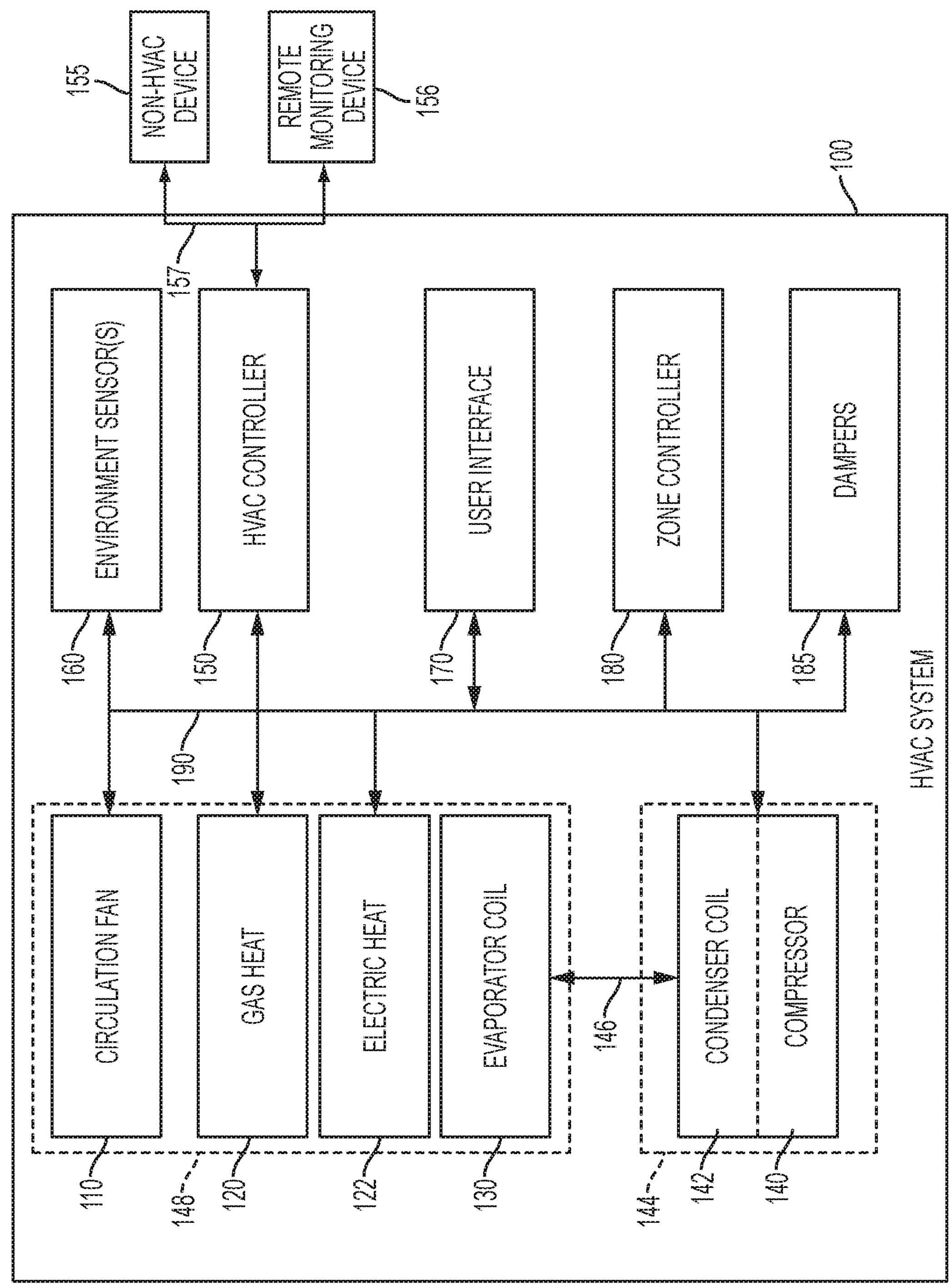
FIG. 1 is a block diagram of an exemplary HVAC system.

FIG. 1 illustrates an HVAC system 100. In various embodiments, the HVAC system 100 is a networked HVAC system that is configured to condition air via, for example, heating, cooling, humidifying, or dehumidifying air. The HVAC system 100 can be a residential system or a commercial system such as, for example, a roof top system. For exemplary illustration, the HVAC system 100, as illustrated in FIG. 1, includes various components; however, in other embodiments, the HVAC system 100 may include additional components that are not illustrated but typically included within HVAC systems.

The HVAC system 100 includes a circulation fan 110, a gas heat 120, an electric heat 122 typically associated with the circulation fan 110, and a refrigerant evaporator coil 130, also typically associated with the circulation fan 110. The circulation fan 110, the gas heat 120, the electric heat 122, and the refrigerant evaporator coil 130 are collectively referred to as an "indoor unit" 148. In various embodiments, the indoor unit 148 is located within, or in close proximity to, an enclosed space 101. Some HVAC systems are packaged in one chassis and conditioned air is moved to and from the enclosed space 101. The HVAC system 100 also includes a compressor 140 and an associated condenser coil 142, which are typically referred to as an "outdoor unit" 144. In various embodiments, the compressor 140 may be, for example a fixed-speed compressor, a variable-speed compressor, a single-stage compressor, or a multi-stage compressor. In various embodiments, the outdoor unit 144 is, for example, mounted on a roof of a building or at ground-level. The compressor 140 and the associated condenser coil 142 are connected to an associated evaporator coil 130 by a refrigerant line 146. In various embodiments, the compressor 140 may be a compressor system including at least two compressors of the same or different capacities. The circulation fan 110, sometimes referred to as a blower, may be a single-speed blower or may, in various embodiments be configured to operate at different capacities (i.e., variable motor speeds) to circulate air through the HVAC system 100, whereby the circulated air is conditioned and supplied to the enclosed space 101.

Still referring to FIG. 1, the HVAC system 100 includes an HVAC controller 150 that is configured to control operation of the various components of the HVAC system 100 such as, for example, the circulation fan 110, the gas heat 120, the electric heat 122, and the compressor 140. In various embodiments, the HVAC system 100 may be a zoned system. In such embodiments, the HVAC system 100 includes a zone controller 180, dampers 185, and a plurality of environment sensors 160. The HVAC controller 150 cooperates with the zone controller 180 and the dampers 185 to regulate the environment of the enclosed space.

The HVAC controller 150 may be an integrated controller or a distributed controller that directs operation of the HVAC system 100. The HVAC controller 150 includes an interface to receive, for example, thermostat calls, temperature setpoints, blower control signals, environmental conditions, and operating mode status for various zones of the HVAC system 100. The HVAC controller 150 also includes a processor and a memory to direct operation of the HVAC system 100 including, for example, a speed of the circulation fan 110.

Still referring to FIG. 1, in some embodiments, the plurality of environment sensors 160 is associated with the HVAC controller 150 and also optionally associated with a user interface 170. In some embodiments, the user interface 170 provides additional functions such as, for example, operational, diagnostic, status message display, and a visual interface that allows at least one of an installer, a user, a support entity, and a service provider to perform actions with respect to the HVAC system 100. In some embodiments, the user interface 170 is, for example, a thermostat of the HVAC system 100. In other embodiments, the user interface 170 is associated with at least one sensor of the plurality of environment sensors 160 to determine the environmental condition information and communicate that information to the user. The user interface 170 may also include a display, buttons, a microphone, a speaker, or other components to communicate with the user. Additionally, the user interface 170 may include a processor and memory that is configured to receive user-determined parameters, and calculate operational parameters of the HVAC system 100 as disclosed herein.

The HVAC system 100 is configured to communicate with a plurality of devices such as, for example, a monitoring device 156, a communication device 155, and the like. The monitoring device 156 is not part of the HVAC system 100. For example, the monitoring device 156 is a server or computer of a third party such as, for example, a manufacturer, a support entity, a service provider, and the like. In other embodiments, the monitoring device 156 is located at an office of, for example, the manufacturer, the support entity, the service provider, and the like.

The communication device 155 is a non-HVAC device having a primary function that is not associated with HVAC systems. For example, non-HVAC devices include mobile-computing devices that are configured to interact with the HVAC system 100 to monitor and modify at least some of the operating parameters of the HVAC system 100. Mobile computing devices may be, for example, a personal computer (e.g., desktop or laptop), a tablet computer, a mobile device (e.g., smart phone), and the like. The communication device 155 includes at least one processor, memory and a user interface, such as a display. One skilled in the art will also understand that the communication device 155 disclosed herein includes other components that are typically included in such devices including, for example, a power supply, a communications interface, and the like.

The zone controller 180 is configured to manage movement of conditioned air to designated zones of the enclosed space 101. Each of the designated zones include at least one conditioning or demand unit such as, for example, the gas heat 120 and at least one user interface 170 such as, for example, the thermostat. The zone-controlled HVAC system 100 allows the user to independently control the temperature in the designated zones. The zone controller 180 operates electronic dampers 185 to control air flow to the zones of the enclosed space.

In some embodiments, a data bus 190, which in the illustrated embodiment is a serial bus, couples various components of the HVAC system 100 together such that data is communicated therebetween. The data bus 190 may include, for example, any combination of hardware, software embedded in a computer readable medium, or encoded logic incorporated in hardware or otherwise stored (e.g., firmware) to couple components of the HVAC system 100 to each other. As an example and not by way of limitation, the data bus 190 may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 190 may include any number, type, or configuration of data buses 90, where appropriate. In particular embodiments, one or more data buses 90 (which may each include an address bus and a data bus) may couple the HVAC controller 150 to other components of the HVAC system 100. In other embodiments, connections between various components of the HVAC system 100 are wired. For example, conventional cable and contacts may be used to couple the HVAC controller 150 to the various components. In some embodiments, a wireless connection is employed to provide at least some of the connections between components of the HVAC system such as, for example, a connection between the HVAC controller 150 and the circulation fan 110 or the plurality of environment sensors 160.

Figure 2:
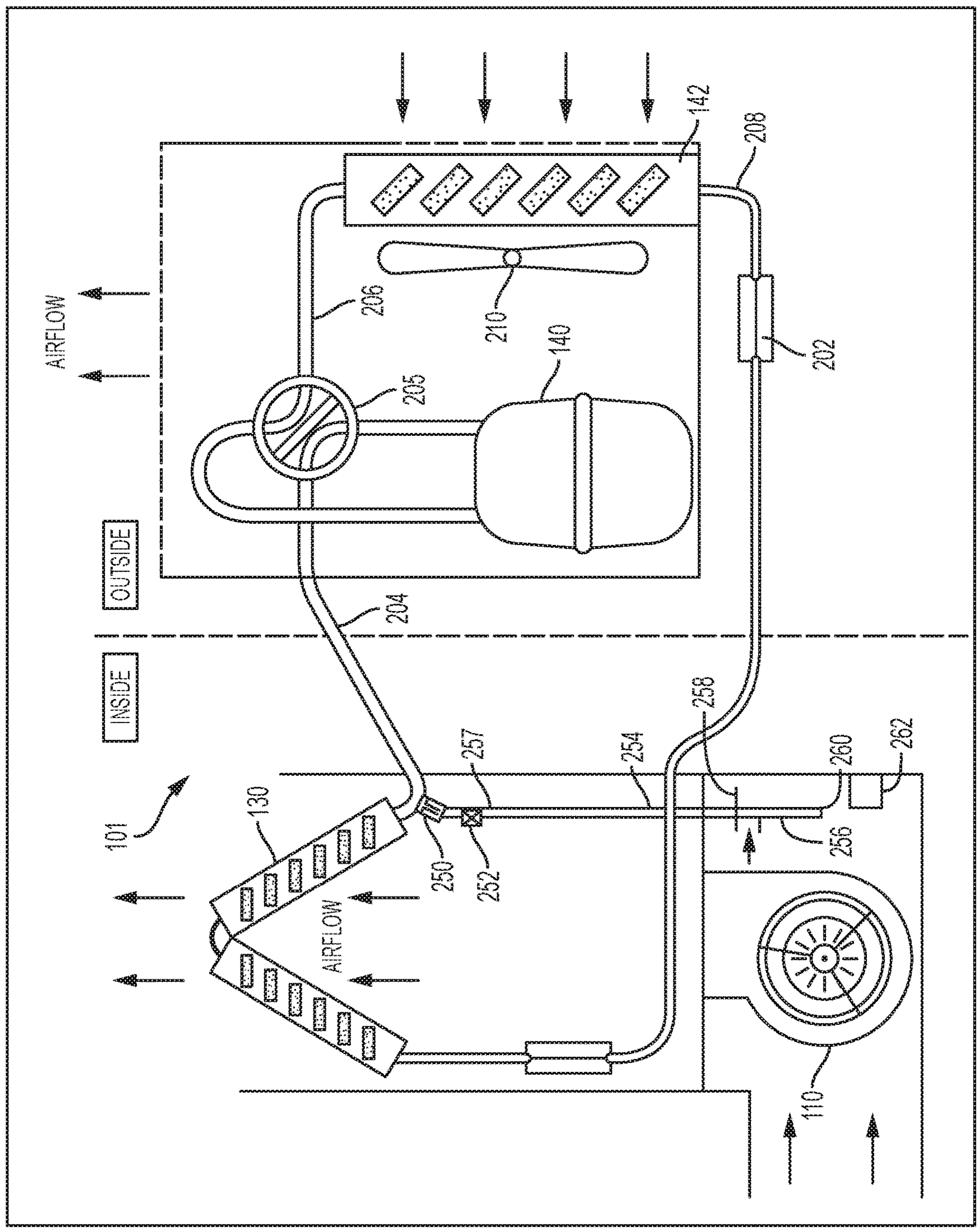
FIG. 2 is a schematic diagram of an exemplary HVAC system.

FIG. 2 is a schematic diagram of the HVAC system 100. For illustrative purposes, FIG. 2 will be described herein relative to FIG. 1. In a various embodiments, the HVAC system 100 may be arranged as, for example, a package HVAC system, a split HVAC system, or any other HVAC system arrangement. The HVAC system 100 includes the refrigerant evaporator coil 130, the condenser coil 142, the compressor 140, and a metering device 202. The metering device 202 is, for example, a thermostatic expansion valve or a throttling valve. The refrigerant evaporator coil 130 is fluidly coupled to the compressor 140 via a suction line 204. The compressor 140 is fluidly coupled to the condenser coil

142 via a discharge line 206. The condenser coil 142 is fluidly coupled to the metering device 202 via a liquid line 208.

Still referring to FIG. 2, during operation, low-pressure, low-temperature refrigerant is circulated through the refrigerant evaporator coil 130. The refrigerant is initially in a liquid/vapor state. In various embodiments, the refrigerant may be, for example, R-32 or R-452B; however, in other embodiments, other types of refrigerant could be utilized. Air from within the enclosed space 101, which is typically warmer than the refrigerant, is circulated around the refrigerant evaporator coil 130 by the circulation fan 110. The refrigerant begins to boil after absorbing heat from the air and changes state to a low-pressure, low-temperature, superheated vapor refrigerant. Saturated vapor, saturated liquid, and saturated fluid refer to a thermodynamic state where a liquid and its vapor exist in approximate equilibrium with each other. Super-heated fluid and super-heated vapor refer to a thermodynamic state where a refrigerant is heated above a saturation temperature of the refrigerant. Sub-cooled fluid and sub-cooled liquid refers to a thermodynamic state where a refrigerant is cooled below the saturation temperature of the refrigerant.

The low-pressure, low-temperature, super-heated vapor refrigerant is introduced into the compressor 140 via the suction line 204. The compressor 140 increases the pressure of the low-pressure, low-temperature, super-heated vapor refrigerant and, by operation of the ideal gas law, also increases the temperature of the low-pressure, low-temperature, super-heated vapor refrigerant to form a high-pressure, high-temperature, superheated vapor refrigerant. After leaving the compressor 140, the high-pressure, high-temperature, superheated vapor refrigerant travels through the discharge line 206 and enters the condenser coil 142.

Outside air is circulated around the condenser coil 142 by a condenser fan 210. The outside air is typically cooler than the high-pressure, high-temperature, superheated vapor refrigerant present in the condenser coil 142. Thus, heat is transferred from the high-pressure, high-temperature, superheated vapor refrigerant to the outside air. Removal of heat from the high-pressure, high-temperature, superheated vapor refrigerant causes the high-pressure, high-temperature, superheated vapor refrigerant to condense and change from a vapor state to a high-pressure, high-temperature, sub-cooled liquid state. The high-pressure, high-temperature, sub-cooled liquid refrigerant leaves the condenser coil 142 via the liquid line 208 and enters the metering device 202.

In the metering device 202, the pressure of the high-pressure, high-temperature, sub-cooled liquid refrigerant is abruptly reduced. In various embodiments where the metering device 202 is, for example, a thermostatic expansion valve, the metering device 202 reduces the pressure of the high-pressure, high-temperature, sub-cooled liquid refrigerant by regulating an amount of refrigerant that travels to the refrigerant evaporator coil 130. Abrupt reduction of the pressure of the high-pressure, high-temperature, sub-cooled liquid refrigerant causes rapid evaporation of a portion of the high-pressure, high-temperature, sub-cooled liquid refrigerant, commonly known as flash evaporation. The flash evaporation lowers the temperature of the resulting liquid/vapor refrigerant mixture to a temperature lower than a temperature of the air in the enclosed space 101. The liquid/vapor refrigerant mixture leaves the metering device 202 and returns to the refrigerant evaporator coil 130.

Still referring to FIG. 2, a metering orifice 250 is coupled to the suction line 204. In various embodiments, the metering orifice 250 may be, for example, an orifice plate, a venturi device, or any other type of metering device. In various embodiments, the metering orifice 250 may be, for example, a short-tube orifice having a tube length that is several times the tube diameter. The metering orifice 250 is fluidly coupled to a valve 252 such as, for example, a solenoid valve. During operation, the metering orifice 250 limits an amount of refrigerant that passes from the suction line 204 into the valve 252. In various embodiments, the metering orifice 250 may be located at any point in the HVAC system 100 that will be a source of refrigerant vapor but not refrigerant liquid. The valve 252 is electrically connected to the HVAC controller 150. In various embodiments, a first end 257 of a connecting tube 254 is coupled to the valve 252 and a mixing device 256 is coupled to a second end 258 of the connecting tube. However, in various embodiments, the connecting tube 254 could be in the form of a small chamber and the mixing device 256 could be directly coupled to the valve 252. The mixing device 256 includes an output orifice 260 that is positioned proximate a refrigerant detector 262. In various embodiments, the mixing device 256 and the refrigerant detector 262 are positioned proximate the circulation fan 110; however, in other embodiments, the mixing device 256 and the refrigerant detector 262 may be positioned in other locations where flammable refrigerant might accumulate. The HVAC system also includes a reversing valve 205 fluidly coupled to the compressor 140. When actuated, the reversing valve 205 reverses the flow of refrigerant through the condenser 142 and the evaporator 130 thereby allowing the HVAC system to be used for heating applications as well as cooling applications.

Figure 3:
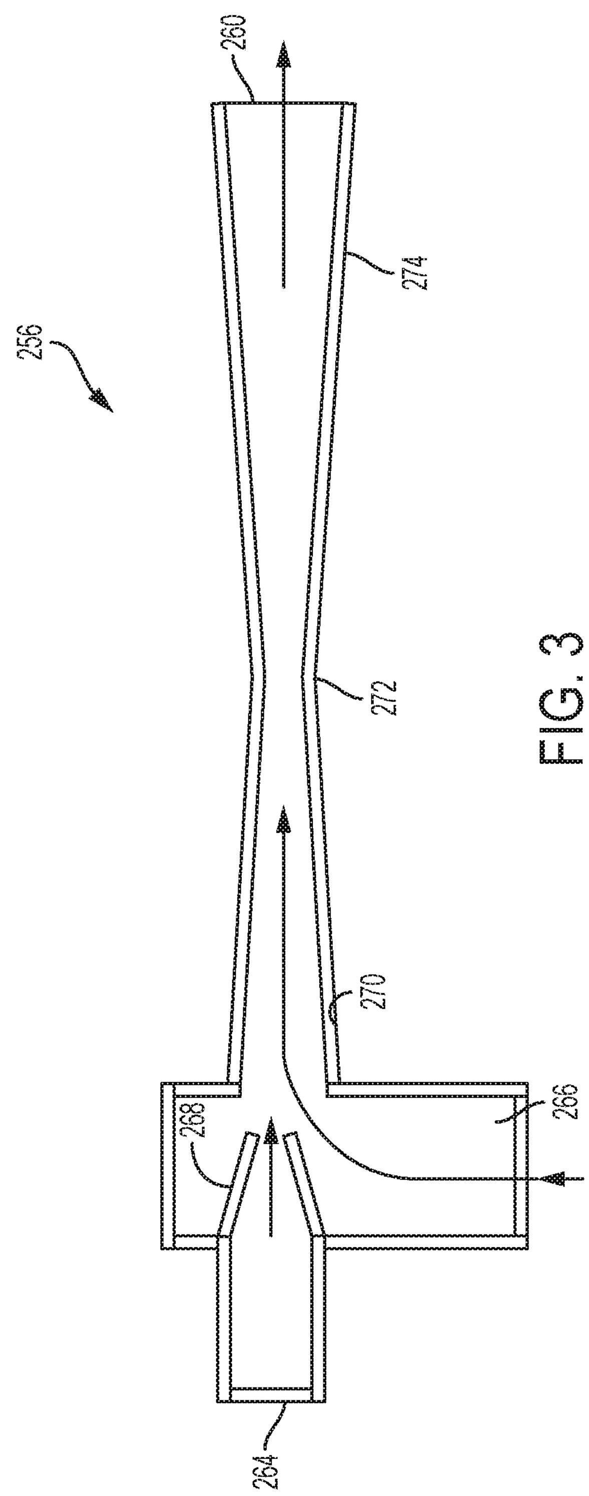
FIG. 3 is a side cross-sectional view of a mixing device.

FIG. 3 is side-cross sectional view of the mixing device 256. An input orifice 264 of the mixing device 256 is coupled to the connecting tube 254. During operation the input orifice 264 receives intermittent flow of refrigerant via the valve 252 from the connecting tube 254. An air intake 266 is positioned proximate the input orifice 264. The air intake 266 is arranged generally perpendicular to the input orifice 264; however, in other embodiments, other arrangements could be utilized. A flow restriction 268 is positioned about an interior of the input orifice 264. The flow restriction 268 meters an amount of refrigerant and increases the velocity of refrigerant that passes through the mixing device 256. Introduction of atmospheric air, via the air intake 266 causes the refrigerant to become entrained in the air and create a mixture of, for example, approximately 4% refrigerant and approximately 96% air. A body 270 of the mixing device 256 directs the air/refrigerant mixture towards the output orifice 260. The body includes a throttling portion 272 of a reduced interior cross-sectional area and a diffuser section 274 positioned downstream of the throttling portion 272 and having a gradually increasing interior cross-sectional area. The expanding/contracting shape of the mixing device 256 facilitates the creation of a uniform mixture of air and refrigerant. The relative sizes of the input orifice 264 and the air intake 266 allows the concentration of the refrigerant/air mixture to be set. The output orifice 260 is located at an end of the diffuser section 274. The refrigerant detector 262 has a factory-set alarm level that is appropriate for the refrigerant in use. To test the refrigerant detector 262 for sensitivity, the calibrated mixture of refrigerant and air is set to be slightly above the predetermined alarm level of the refrigerant detector 262. A successful test occurs when the refrigerant detector 262 alarms after exposure to a puff of refrigerant/air mixture with refrigerant concentration slightly above the alarm setpoint.

Referring to FIGS. 2-3, in operation, the HVAC controller 150 measures a calibration interval and will attempt to calibrate the refrigerant detector 262 when the calibration interval has been measured. In various embodiments, the calibration interval is, for example once every six months or once every year. Upon measurement of the calibration interval, the HVAC controller 150 directs the valve 252 to open for a first period of time such as, for example, 1 second. The refrigerant is typically at a pressure many times higher than atmospheric pressure. This pressure is used to induce the flow of air into the mixing device 256. A short burst of one or more seconds is adequate to provide the refrigerant detector 260 with a sample mixture. When the valve 252 is opened an amount of refrigerant is metered by the metering orifice 250 to pass through the valve 252 and into the connecting tube 254. The amount of refrigerant released by the valve 252 does not contribute to a loss of performance of the HVAC system and is considered "de minimis" by EPA regulations. For example, it is estimated that approximately four grams of refrigerant is lost from an HVAC system each time service work is performed. Such refrigerant loss is considered acceptable by EPA standards. In comparison, approximately one-half a gram of refrigerant is sufficient to check the calibration of the refrigerant detector 262. In any event, the amount of refrigerant metered by the metering orifice 250 and released by the valve 252 is not sufficient to contribute to a loss of performance of the HVAC system 100. The refrigerant is mixed with air in the mixing device 256 to create an air/refrigerant mixture. In various embodiments, the refrigerant/air mixture is approximately 4% refrigerant and approximately 96% air; however, in other embodiments, other mixture ratios could be utilized. In any event, the refrigerant content of the refrigerant/air mixture should be approximately 25% of the lower flammability threshold of the refrigerant. The air/refrigerant mixture is discharged from the output orifice 260 towards the refrigerant detector 262. The HVAC controller 150 detects if the refrigerant detector 262 triggers an alarm in the presence of the refrigerant/air mixture.

Figure 4:
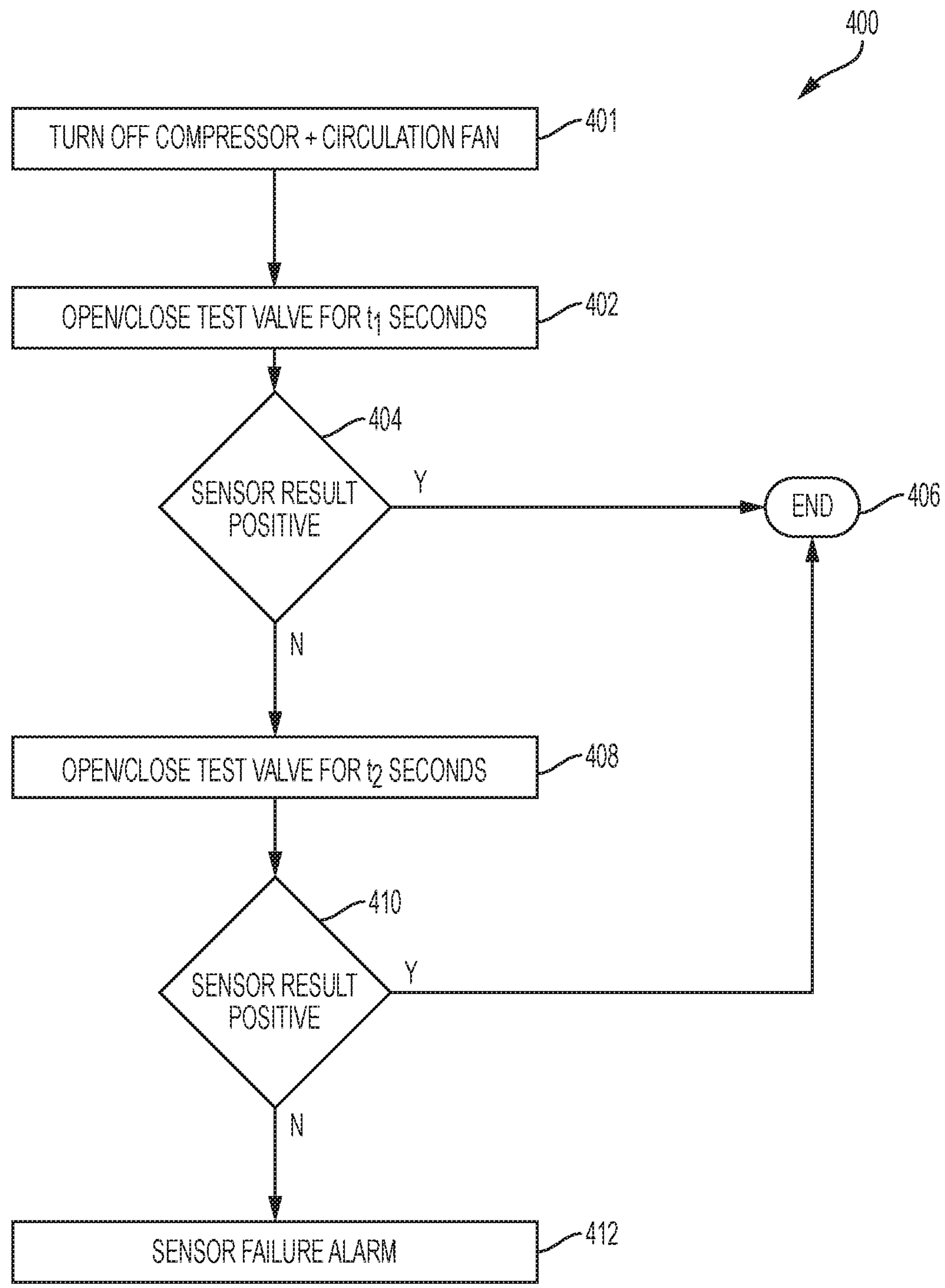
FIG. 4 is a flow diagram illustrating a process for calibrating a refrigerant sensor.

FIG. 4 is a flow diagram of a process 400 for calibrating a refrigerant sensor. At block 401, the compressor 140 and the circulation fan 110 are turned off. At block 402, the valve 252 opens for the first pre-determined time period such as, for example, 1 second. At block 404, the HVAC controller 150 determines if the refrigerant detector 262 has alarmed. If the refrigerant detector 262 alarms, the process 400 ends at block 406. If the refrigerant detector 262 has not alarmed, the process 400 proceeds to block 408 where the valve 252 is again opened for a second predetermined period of time such as, for example, 1 second. The second pre-determined period of time may be equal to or different than the first pre-determined period of time. At block 410, the HVAC controller 150 determines if the refrigerant detector 262 has alarmed. If the refrigerant detector 262 alarms, the process 400 ends at block 406. If the refrigerant detector 262 has not alarmed, the process 400 proceeds to block 412 where a refrigerant detector failure alert is generated. Thus, in use, the HVAC system 100 self-calibrates the refrigerant detector 262, utilizing refrigerant already present in the HVAC system 100, to a specific amount of refrigerant thereby eliminating a need for maintenance to be performed by a service technician. The refrigerant discharged during testing of the refrigerant detector 262 is environmentally safe and does not contribute to a loss of performance of the HVAC system 100.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms, methods, or processes). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others. "can," "might." "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A refrigerant detector testing system comprising:
- a metering orifice formed in a suction line that is disposed between an evaporator coil and a compressor;
- a valve fluidly coupled to the metering orifice;
- a connecting tube fluidly coupled to the valve on a side opposite the metering orifice;
- a mixing device having an input orifice fluidly coupled to the connecting tube, the mixing device comprising:
  - an air intake disposed proximate the input orifice;
  - a flow restriction positioned about an interior of the input orifice, wherein the flow restriction terminates at an end in the air intake and decreases in diameter relative to the input orifice at the end;
  - a throttling portion downstream of the input orifice and the air intake, the throttling portion having a reduced cross-sectional area; and
  - a diffuser section positioned downstream of the throttling portion, the diffuser section having an output orifice; and
- a refrigerant detector fluidly exposed to the output orifice.

2. The refrigerant detector testing system of claim 1, wherein the valve is a solenoid valve.

3. The refrigerant detector testing system of claim 1, wherein the valve is electrically connected to an HVAC controller.

4. The refrigerant detector testing system of claim 1, wherein the refrigerant detector is positioned proximate a circulation fan in an HVAC system.

5. The refrigerant detector testing system of claim 1, wherein the input orifice of the mixing device is disposed perpendicular to the air intake of the mixing device.

6. The refrigerant detector testing system of claim 1, wherein the metering orifice is an orifice plate.

* * * * *